United States Patent [19]
Yoshinari et al.

[11] Patent Number: 6,086,993
[45] Date of Patent: Jul. 11, 2000

[54] MAGNETO-OPTICAL RECORDING MEDIUM

[75] Inventors: Jiro Yoshinari; Shinji Miyazaki; Hiroyasu Inoue, all of Nagano, Japan

[73] Assignee: TDK Corporation, Tokyo, Japan

[21] Appl. No.: 09/067,258

[22] Filed: May 4, 1998

[30] Foreign Application Priority Data

May 12, 1997 [JP] Japan ..................................... 9-137859

[51] Int. Cl.$^7$ ........................... B32B 15/01; B32B 15/18; G11B 11/10; G11B 5/66
[52] U.S. Cl. .................. 428/336; 428/694 MM; 428/694 EC; 428/694 MT; 428/694 RE; 369/13; 369/288
[58] Field of Search .............................. 369/13, 272, 283, 369/288; 428/64.3, 694 ML, 694 SC, 694 MT, 694 RE, 694 MM, 694 EC, 332, 336, 212, 213, 215, 220

[56] References Cited

U.S. PATENT DOCUMENTS

| | | | |
|---|---|---|---|
| 5,241,520 | 8/1993 | Ohta et al. | 369/13 |
| 5,353,171 | 10/1994 | Suzuki et al. | 360/59 |
| 5,389,455 | 2/1995 | Saito | 428/694 EC |
| 5,428,585 | 6/1995 | Hirokane et al. | 369/13 |
| 5,740,133 | 4/1998 | Tamanoi et al. | 369/13 |
| 5,889,740 | 3/1999 | Nakayama et al. | 369/13 |

FOREIGN PATENT DOCUMENTS

| | | |
|---|---|---|
| 652 556 A2 | 5/1995 | European Pat. Off. . |
| WO90/02400 | 3/1990 | Japan . |
| 3-219449 | 9/1991 | Japan . |
| 6-012711 | 1/1994 | Japan . |
| 7-029231 | 1/1995 | Japan . |

*Primary Examiner*—Deborah Jones
*Assistant Examiner*—Michael laVilla
*Attorney, Agent, or Firm*—Laubscher & Laubscher; R. J. Lasker, Esq.

[57] ABSTRACT

A magneto-optical recording medium capable of direct overwriting in a light intensity modulation mode comprises a magnetic multilayer structure comprising, in order form an surface side thereof, a readout layer $R_{01}$, a memory layer $M_1$, an exchange force control layer $C_{12}$ and a recording layer $W_2$, four layers in all. The magnetic multilayer structure satisfies $TC_{W2} > Tc_{M1}$, $t_{R01}/(t_{R01}+t_{M1}) = 0.3$ to 0.6, and $t_{R01}+t_{M1} = 20$ to 40 nm where $Tc_{M1}$ is a Curie temperature of $M_1$, $Tc_{W2}$ is a Curie temperature of $W_2$, $t_{R01}$ is a thickness of $R_{01}$, and $t_{M1}$ is a thickness of $M_1$. $R_{01}$ contains Gd, Fe, and Co as main components with the proviso that Gd is contained in an amount of 23 to 27 at %, $M_1$ contains Tb, Fe, and Co as main components with the proviso that Tb is contained in an amount of 21 to 25 at %, and $C_{12}$ contains Gd, Fe, and Co as main components with the proviso that Gd is contained in an amount of 23 to 32 at %, and has a thickness of 30 nm or below.

5 Claims, 3 Drawing Sheets

EMBODIMENT I

EMBODIMENT II

HIGH POWER RECORDING (EMBODIMENT II)

LOW POWER RECORDING (EMBODIMENT II)

MAGNETO-OPTICAL RECORDING MEDIUM

BACKGROUND OF THE INVENTION

The present invention relates to a magneto-optical recording medium capable of direct overwriting in a light intensity modulation mode.

A magneto-optical (MO) recording medium is a recording medium wherein a magnetic thin film is locally heated by laser light or the like, and the magnetization direction of heated domains is reversed by an external magnetic field for recording, and these recorded domains having varying magnetization directions are read out by the Kerr effect, and the Faraday effect.

One feature of the magneto-optical recording medium is that recording density can be increased, and another feature is that, unlike a hard disk that is a mass storage magnetic recording medium, a medium replacement is easily achievable. However, a grave problem with an ordinary magneto-optical recording medium is that rewriting is slow, generally because overwriting cannot be used for rewriting; new information must be recorded after erasure of recorded information.

Magneto-optical recording media capable of direct overwriting by light intensity modulation (which may hereinafter be often called light intensity modulation overwriting), for instance, are disclosed in JP-A 62-175948, JP-B's 8-16993 and 8-16996, etc. For these magneto-optical media, however, it is required to built an initializing magnet in a driving device. On the other hand, magneto-optical recording media which is capable of light intensity modulation overwriting without recourse to any initializing magnet are disclosed in WO 90/02400, Japanese Patent No. 2503708, JP-A 6-12711, etc.

SUMMARY OF THE INVENTION

An object of the invention is to provide a magneto-optical recording medium capable of direct overwriting in a light intensity modulation mode, wherein C/N is improved with a stable storage of recorded information.

The aforesaid object is achievable by the inventions defined below as (1) to (5).

(1) A magneto-optical recording medium capable of direct overwriting in a light intensity modulation mode, which comprises a substrate and a magnetic multilayer structure located on a surface side thereof, wherein:

said magnetic multilayer structure comprises, in order from a substrate side thereof, a readout layer $R_{O1}$, a memory layer $M_1$, an exchange force control layer $C_{12}$ and a recording layer $W_2$, each of said magnetic layers containing a rare earth element and a transition element, said readout layer $R_{O1}$, said memory layer $M_1$, and said recording layer $W_2$ having perpendicular magnetic anisotropy at room temperature, and adjacent magnetic layers being mutually coupled with exchange force, said magnetic multilayer structure satisfying the following conditions:

$$Tc_{W2} > Tc_{M1}$$

$$t_{RO1}/(t_{RO1}+t_{M1}) = 0.3 \text{ to } 0.6$$

$$t_{RO1}+t_{M1} = 20 \text{ to } 40 \text{ nm}$$

where $Tc_{M1}$ is a Curie temperature of said memory layer $M_1$, $Tc_{W2}$ is a Curie temperature of said recording layer $W_2$, $t_{RO1}$ is a thickness of said readout layer $R_{O1}$, and $t_{M1}$ is a thickness of said memory layer $M_1$, said readout layer $R_{O1}$ containing gadolinium, iron, and cobalt as main components with the proviso that gadolinium is contained in an amount of 23 to 27 at %, said memory layer $M_1$ containing terbium, iron, and cobalt as main components with the proviso that terbium is contained in an amount of 21 to 25 at %, and said exchange force control layer $C_{12}$ containing gadolinium, iron, and cobalt as main components with the proviso that gadolinium is contained in an amount of 23 to 32 at %, and having a thickness of 30 nm or below.

(2) The magneto-optical recording medium of (1), wherein said recording layer $W_2$ contains dysprosium, iron, and cobalt as main components.

(3) The magneto-optical recording medium of (1), wherein said magnetic multilayer structure has a thickness of 80 nm or below.

(4) The magneto-optical recording medium of (1) or (2), wherein:

said magnetic multilayer structure further comprises, in order from a surface side of said recording layer $W_2$, a switching layer $S_3$ and an initializing layer $I_4$, each being a magnetic layer containing a rare earth element and a transition element and having perpendicular magnetic anisotropy at room temperature, adjacent layers in said magnetic multilayer structure are mutually coupled with exchange force, and said magnetic multilayer structure satisfy simultaneously the following conditions:

$$Tc_{I4} > Tc_{W2} > Tc_{M1}$$

$$TC_{I4} > Tc_{W2} > Tc_{S3}$$

where $Tc_{M1}$ is the Curie temperature of said memory layer $M_1$, $Tc_{W2}$ is the Curie temperature of said recording layer $W_2$, $Tc_{S3}$ is a Curie temperature of said switching layer $S_3$, and $Tc_{I4}$ is a Curie temperature of said initializing layer $I_4$.

(5) The magneto-optical recording medium of (4), wherein said switching layer $S_3$ contains terbium, and iron as main components, and said initializing layer $I_4$ contains terbium, and cobalt as main components.

By limiting the content of gadolinium or Gd in the readout layer $R_{O1}$ to the aforesaid range according to the invention, it is possible to enhance the Kerr effect and increase carrier signals.

By limiting the content of terbium or Tb in the memory layer $M_1$ to the aforesaid range, it is possible to enhance the coercive force of the memory layer $M_1$ and, hence, store recorded information in a stabilized state.

By limiting the thickness ratio $t_{RO1}/(t_{RO1}+t_{M1})$ to the aforesaid range, it is possible to keep coercive force high on condition that the readout layer $R_{O1}$ and memory layer $M_1$ are integrated with each other by exchange coupling and, hence, stabilize storage of recorded information. By limiting this thickness ratio to the aforesaid range, it is also possible to achieve sufficient enhancement of the Kerr effect and, hence, obtain high-enough C/N.

The exchange force control layer $C_{12}$ is provided to control exchange forces between the readout layer $R_{O1}$ and the recording layer $W_2$, and between the memory layer $M_1$ and the recording layer $W_2$. By using gadolinium or Gd, iron or Fe and cobalt or Co as the main components of the exchange force control layer $C_{12}$ and using Gd in the aforesaid amount on the premise that the Tb content of the memory layer $M_1$ is in the aforesaid range and the thickness $t_{R01}+t_{M1}$ is in the aforesaid range, it is possible to increase carrier signals with a noise decrease and, consequently, obtain high C/N.

In this regard, JP-A 7-29231 discloses a magneto-optical recording medium which comprises at least four layers, i.e., a read layer, a memory layer, an exchange coupling force regulating layer and a writing layer, and which is capable of light intensity modulation overwriting. The read layer, memory layer, exchange coupling force regulating layer and writing layer set forth therein are magnetic layers similar to the readout layer $R_{01}$, memory layer $M_1$, exchange force control layer $C_{12}$ and recording layer $W_2$ in the present invention, respectively. However, nowhere therein are the aforesaid limitation conditions of the invention described whatsoever.

BRIEF DESCRIPTION OF THE DRAWINGS

These and other features of the present invention will be apparent from the following description and drawings, in which.

BEST MODE FOR CARRYING OUT THE INVENTION

Two embodiments I and II of the magneto-optical recording medium according to the present invention are explained.

Figure 1:
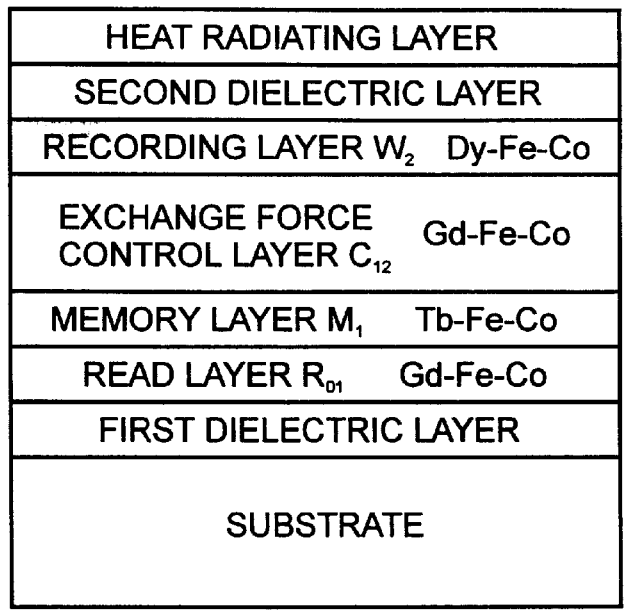
FIG. 1 is a schematic representation of one exemplary construction of the magneto-optical recording medium according to the invention.
Figure 3:
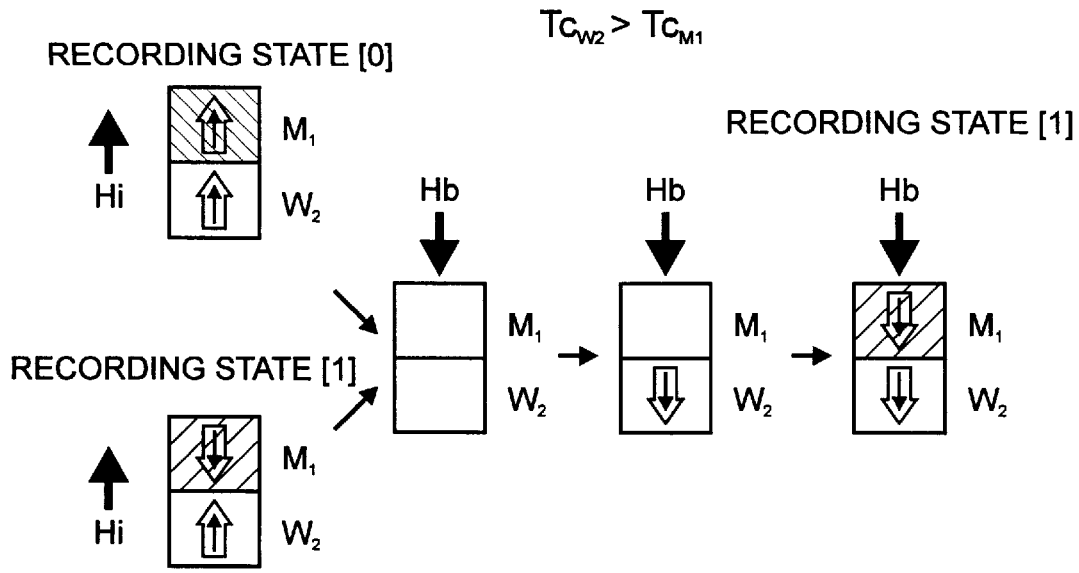
FIG. 3 is one illustration of overwriting on the magneto-optical recording medium according to the invention.
Figure 4:
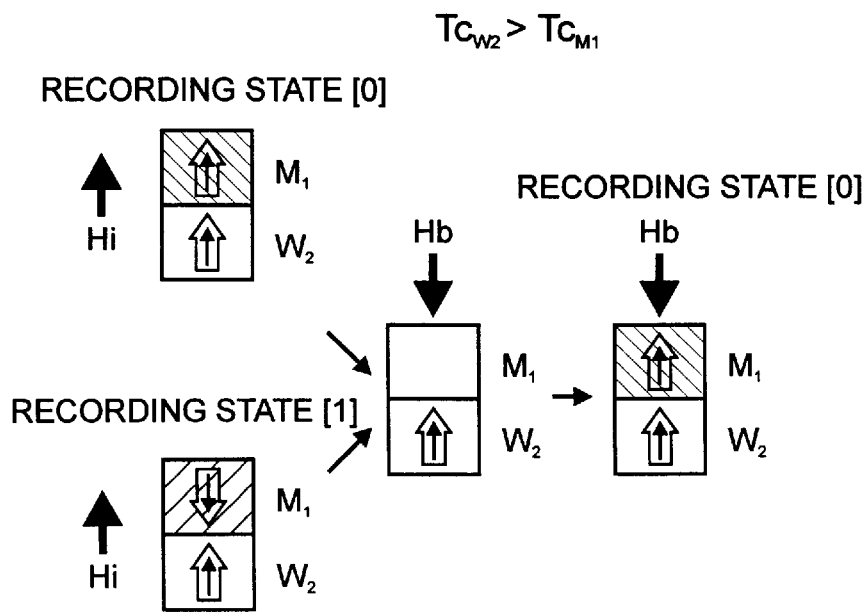
FIG. 4 is another illustration of overwriting one the magneto-optical recording medium according to the invention.

Embodiment I (FIGS. 1, 3, and 4)

Embodiment I of the magneto-optical recording medium is shown in FIG. 1. In this magneto-optical recording medium embodiment, a magnetic multilayer structure is provided on the surface side of a substrate. The magnetic multilayer structure comprises, in order from a substrate side thereof, a readout layer $R_{01}$, a memory layer $M_1$, an exchange force control layer $C_{12}$ and a recording layer $W_2$, four layers in all. On the back side of the magnetic multilayer structure, i.e., between the substrate and the magnetic multilayer structure there is provided a first dielectric layer. On the uppermost side of the magnetic multilayer structure there is a second dielectric layer having a heat radiating layer.

Each of the magnetic layer forming the magnetic multilayer structure of FIG. 1 is made up of an amorphous alloy containing a rare earth element and a transition element, and has perpendicular magnetic anisotropy at room temperature. Adjacent magnetic layers in the multilayer structure are mutually coupled with exchange force.

To perform the light intensity modulation overwriting to be described below, it is required to satisfy the following condition:

$$Tc_{W2} > Tc_{M1}$$

where $Tc_{M1}$ is the Curie temperature of the memory layer $M_1$ and $TC_{W2}$ is the Curie temperature of the recording layer $W_2$.

Light Intensity Modulation Overwriting

How to perform the light intensity modulation overwriting on the magneto-optical recording medium having such construction as shown in FIG. 1 is explained with reference to FIGS. 3, and 4. For simplicity of illustration, only the memory layer $M_1$ and recording layer $W_2$ are shown in FIGS. 3, and 4. The readout layer $R_{01}$ is a magnetic layer for enhancement of read signals, and so has no intermediate influence on the action of the light intensity modulation overwriting. The exchange force control layer $C_{12}$, too, has no intermediate influence on the action of the light intensity modulation overwriting, because it behaves as a magnetic domain wall between the memory layer $M_1$ and the recording layer $W_2$.

In both FIGS. 3 and 4, the condition $Tc_{W2} > Tc_{M1}$ is satisfied.

In FIGS. 3, and 4, let [0] indicate a recording state where magnetic domains having upward magnetization are recorded in the recording layer $M_1$, and let [1] indicate a recording state where magnetic domains having downward magnetization are recorded therein.

A medium capable of overwriting is placed in the recording state [0] or [1]. FIG. 3 is illustrative of the case where, on overwriting, the medium is put in the recording state [1] irrespective of the initial recording state, and FIG. 4 is illustrative of the case where, on overwriting, the medium is put in the recording state [0] irrespective of the initial recording state.

In FIGS. 3, and 4, a white arrow with a small black arrow inside indicates the direction of magnetization of the whole magnetic layer while a black arrow indicates the direction of magnetization of a transition element subordinate lattice in the magnetic layer. In this embodiment, both the memory layer $M_1$ and the recording layer $W_2$ have a compensation temperature lower than room temperature, so that the direction of magnetization of the whole magnetic layer is always in alignment with the direction of magnetization of the transition element subordinate lattice.

Referring to FIG. 3, an upward initializing magnetic field Hi is applied on the magnetic multilayer structure to keep the magnetization of the recording layer $W_2$ upward in FIG. 3. The recording layer $W_2$ has no influence on the magnetization of the memory layer $M_1$, because its coercive force at room temperature is relatively lower than that of the memory layer $M_1$, and so only the direction of magnetization of the recording layer $W_2$ is in alignment with the direction of the initializing magnetic field Hi.

Then, the magnetic multilayer structure is irradiated with a laser beam to bring the temperature of the area of the magnetic multilayer structure irradiated up to $Tc_{W2}$ or higher, thereby allowing the magnetizations of the memory layer $M_1$ and recording layer $W_2$ to vanish. As the laser beam moves, the temperature of the magnetic multilayer structure decreases. Upon the temperature falling below $Tc_{W2}$, the recording layer $W_2$ is magnetized downward by a downwardly applied bias magnetic field Hb, so that the magnetization of the recording layer $W_2$ takes a downward direction. It is here to be noted that the bias magnetic field Hb is always applied for overwriting. Upon the temperature decreasing further and falling below $Tc_{M1}$, the magnetization of the memory layer $M_1$ takes a downward direction by the exchange coupling force between the memory layer $M_1$ and the recording layer $W_2$, and so the magnetic multilayer structure is placed in the recording state [1].

The foregoing are also true of FIG. 4. First, an upward initializing magnetic field Hi is applied on the magnetic multilayer structure to keep the magnetization of the recording layer $W_2$ upward in FIG. 4. Then, the magnetic multilayer structure is irradiated with a laser beam whose power is lower than is the case with FIG. 3 to heat the magnetic multilayer structure to a temperature higher than $Tc_{M1}$ and below $Tc_{W2}$, thereby allowing the magnetization of the memory layer $M_1$ to vanish. Then, as the temperature of the magnetic multilayer structure is below $Tc_{M1}$, the magnetization of the transition element subordinate lattice in the memory layer $M_1$ takes an upward direction by the exchange force between the memory layer $M_1$ and the recording layer $W_2$, and so the magnetic multilayer structure is placed in the recording state [0]. In FIG. 4, too, the bias magnetic field Hb is always applied, as in the case of FIG. 3, for the purpose of averting the on and off of the bias magnetic field Hb. Thus, the bias magnetic field Hb has no influence on the overwriting process of FIG. 4.

After overwriting, the recording layer $W_2$ is magnetized downward in the case of FIG. 3 for high power recording, and upward in the case of FIG. 4 for low power recording. In either case, the initializing magnetic field Hi is applied before the next overwriting, whereby the transition element subordinate lattice in the recording layer $W_2$ is magnetized upward; that is, the direction of magnetization of the recording layer $W_2$ just before overwriting is independent of hysteresis. By irradiating the magnetic multilayer structure with a laser beam of high power or lower just after initialization, therefore, it is possible to perform overwriting repeatedly. In other words, the light intensity modulation overwriting becomes feasible.

As can be see from FIGS. 3 and 4, each magnetic layer has the following role. The memory layer $M_1$ is a magnetic layer for storing the information to be read using the Kerr effect. The recording layer $W_2$ is a magnetic layer that plays a role in the magnetization of the memory layer $M_1$ by exchange coupling force, and determines the direction of magnetization of the memory layer $M_1$.

For simplicity of illustration, the magnetic multilayer structure is assumed to be heated to $Tc_{W2}$ or higher in the case of FIG. 3. However, if the recording layer $W_2$ can practically be in alignment with the direction of the bias magnetic field, the objective temperature can then be below $Tc_{W2}$. Likewise, the magnetic multilayer structure is assumed to be heated to a temperature that is higher than $Tc_{m1}$ and below $Tc_{W2}$ in the case of FIG. 4. However, if the magnetization of the recording layer $W_2$ can be transferred to the memory layer $M_1$, the objective temperature can then be below $Tc_{M1}$.

Magnetic Multilayer Structure

In the present invention, the magnetic multilayer structure in the magneto-optical recording medium capable of the light intensity modulation overwriting is constructed as follows.

Readout Layer $R_{O1}$

The readout layer $R_{O1}$, to be coupled to the memory layer $M_1$ by exchange force, is provided to achieve C/N improvements.

The readout layer $R_{O1}$ is made up of an amorphous alloy composed mainly of Gd, Fe, and Co. The Gd content of the readout layer $R_{O1}$ is in the range of 23 to 27 at %, and preferably 24 to 26 at %. Too much or little Gd gives rise to a Curie temperature drop and, hence, a C/N drop. The readout layer $R_{O1}$ has an atomic ratio, Fe/(Fe+Co), of 0.65 to 0.75, and preferably 0.68 to 0.73. Too high or low an atomic ratio results in a decrease in the Kerr effect due to a Curie temperature drop and, hence, a C/N drop.

The thickness of the readout layer $R_{O1}$ may be found from the following conditions:

$t_{R01}/(t_{R01}+t_{M1})$=0.3 to 0.6

$t_{R01}+t_{M1}$=20 to 40 nm

Here $t_{R01}$ is the thickness of the readout layer $R_{O1}$, and $t_{M1}$ is the thickness of the memory layer $M_1$. When $t_{R01}/(t_{R01}+t_{M1})$ is too small, the Kerr effect becomes slender, resulting in a C/N drop, and when $t_{R01}/(t_{01}+t_{M1})$ is too large, the combined coercive force of the readout layer $R_{O1}$ and memory layer $M_1$ decreases, resulting in unstable storage of recorded information. When $t_{R01}+t_{M1}$ is too small, the Kerr effect becomes slender, resulting in a C/N drop, and when $t_{R01}+t_{M1}$ is too large, a post-overwriting C/N drops due to insufficient transfer of magnetization of the recording layer to the memory layer.

Memory Layer $M_1$

The memory layer $M_1$ contains Tb, Fe, and Co as main components. The Tb content of the memory layer $M_1$ is in the range of 21 to 25 at %, and preferably 21 to 23 at %. Too little or much Tb results in too low a coercive force or Curie temperature. The memory layer $M_1$ has an atomic ratio, Fe/(Fe+Co), of preferably 0.85 to 0.95, and more preferably 0.88 to 0.92. Too low an atomic ratio results in too high a Curie temperature whereas too high an atomic ratio leads too low a Curie temperature.

The thickness of the memory layer $M_1$ may be determined on the basis of its relation to the thickness of the readout layer $R_{O1}$, as already mentioned.

Preferably, the memory layer $M_1$ contains a non-magnetic element. By adding the non-magnetic element to the memory layer, it is possible to achieve C/N improvements because of an output increase. Preferably but not exclusively, at least one non-magnetic element is selected from Cr, Ti, Ta, Mo, W, V, Zr, Nb, Al, etc. In view of corrosion resistance improvements and cost, however, it is preferable to use Cr in combination with other element, with the sole use of Cr being most preferred.

Exchange Force Control Layer $C_{12}$

The exchange force control layer $C_{12}$ is provided to control the exchange force between the memory $M_1$ and the recording layer $W_2$. To this end, a layer of any desired construction may be used with proviso that it has such an effect. However, the following layers are preferred in the practice of the invention.

(1) A layer containing Gd, Fe, and Co as main components, with the easy axis of magnetization lying in its own plane direction at room temperature, wherein the temperature at which the easy axis of magnetization takes a vertical direction is found in the range of higher than 100° C. to the Curie temperature of the exchange force control layer $C_{12}$.

(2) A layer containing Gd, Fe, and Co as main components, with the easy axis of magnetization lying in its own plane direction.

Of these layers, particular preference is given to (1). When the exchange force control layer $C_{12}$ is made up of layer (1), the easy axis of magnetization changes direction in the vicinity of its compensation temperature. Transfer of magnetization from the recording layer $W_2$ to the memory layer $M_1$ by exchange force is explained with reference to FIGS. 3, and 4. This transfer of magnetization takes place easily, because the easy axis of magnetization of the exchange force control layer $C_{12}$ is in the vertical direction. On the other hand, the operation for a reversal of magnetization of the recording layer $W_2$ by the application of the initializing magnetic field Hi to the magnetic multilayer structure in the recording state [1] is carried out at room temperature. Since, at this time, the easy axis of magnetization of the exchange force control layer $C_{12}$ is in its own plane direction, the exchange force between the memory layer $M_1$ and recording layer $W_2$ can be cut off, so that a change in the state of magnetization of the memory layer $M_1$ upon application of the initializing magnetic field Hi can be effectively prevented.

The exchange force control layer $C_{12}$, if it is made up of layer (2), is basically effective for decreasing the exchange force between the recording layer $W_2$ and the memory layer $M_1$. By the provision of such an exchange force control layer $C_{12}$, therefore, it is possible to prevent the reversal (initialization) of magnetization of the recording layer $W_2$ from having any adverse influence on the memory layer $M_1$.

Preferably, the exchange force control layer $C_{12}$ contains Gd, Fe, and Co as main components. Preferably in this case, the Gd content is in the range of 23 to 32 at %, and especially 24 to 30 at %. This range of the Gd content ensures a high C/N even upon repeated overwriting. When the layer (1) having too low a Gd content is used as the exchange force control layer $C_{12}$, the exchange force between this layer and other magnetic layer becomes too strong upon the easy axis of magnetization taking a vertical direction, rendering overwriting difficult. On the other hand, it is not preferable to construct the exchange force control layer $C_{12}$ of the layer (1) having too high a Gd content, because the exchange force between this layer and other magnetic layer becomes too weak when the easy axis of magnetization takes a vertical direction. The layer (1), when used as the exchange force control layer $C_{12}$, has an atomic ratio, Fe/(Fe+Co), of preferably 0.40 to 0.80, and more preferably 0.50 to 0.60. When the atomic ratio is too low, the exchange force becomes too weak when the easy axis of magnetization takes a vertical direction, and when the atomic ratio is too high, the Curie temperature becomes too low.

The thickness of the exchange force control layer $C_{12}$ is 30 nm or below, preferably 5 to 30 nm, and more preferably 8 to 20 nm. When the exchange force control layer $C_{12}$ is too thin, it is difficult to make use of the aforesaid action and thereby gain control of exchange force, and when the exchange force control layer $C_{12}$ is too thick, the exchange force between this layer and other magnetic layer becomes too weak.

Recording Layer $W_2$

The recording layer $W_2$ contains dysprosium or Dy, Fe, and Co as main components, and the rare earth element content of the recording layer $W_2$ is preferably 29 to 35 at %, and more preferably 30 to 33 at %. Too low a rare earth element content renders the initialization of the recording layer $W_2$ difficult, resulting in some considerable C/N drop upon overwriting. Too high a rare earth element content, on the other hand, gives rise to some considerable C/N drop, resulting in a much more reduced C/N upon overwriting.

The recording layer $W_2$ has an atomic ratio, Fe/(Fe+Co), of 0.40 to 0.58, and preferably 0.45 to 0.55. Too low an atomic ratio gives rise to a C/N drop whereas too high an atomic ratio results in some considerable C/N drop upon over-writing.

For the recording layer $W_2$, it is preferable to have a compensation temperature in a range of temperature that is higher than room temperature and lower than the temperature at which magnetization is transferred to the memory layer $M_1$. That is, the compensation temperature of the recording layer $W_2$ is preferably 100 to 160° C.

The thickness of the recording layer $W_2$ is preferably 15 nm or more, and more preferably 20 nm or more. When the recording layer $W_2$ is too thin, the exchange force between this layer and the memory layer $M_1$ becomes too strong for overwriting. On the other hand, no problem arises when the recording layer $W_2$ is thick. In view of production cost reductions, however, the upper limit on the thickness of the recording layer $W_2$ is preferably 60 nm, and especially 50 nm.

In embodiment I, it is preferable that the overall thickness of the magnetic multilayer structure comprising four magnetic layers should not exceed 80 nm. At a thickness exceeding 80 nm any high recording sensitivity is hardly available.

Figure 2:
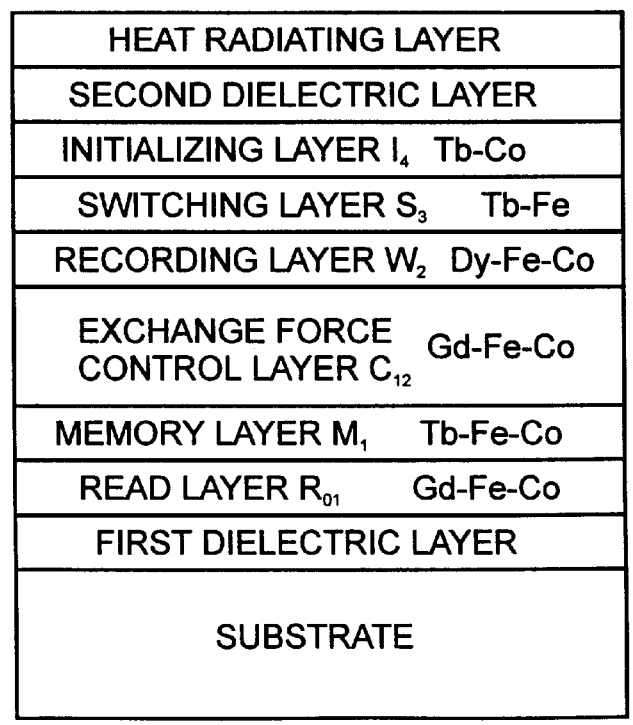
FIG. 2 is a schematic representation of another exemplary construction of the magneto-optical recording medium according to the invention.
Figure 5:
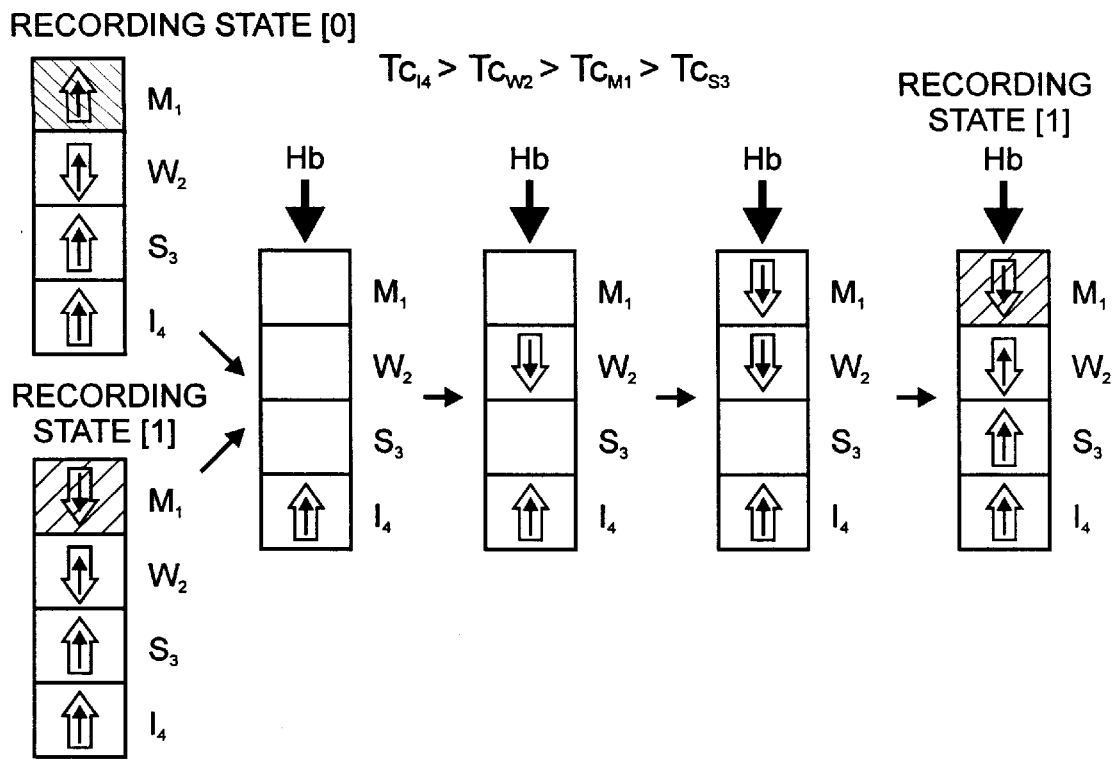
FIG. 5 is yet another illustration of overwriting on the magneto-optical recording medium according to the invention.
Figure 6:
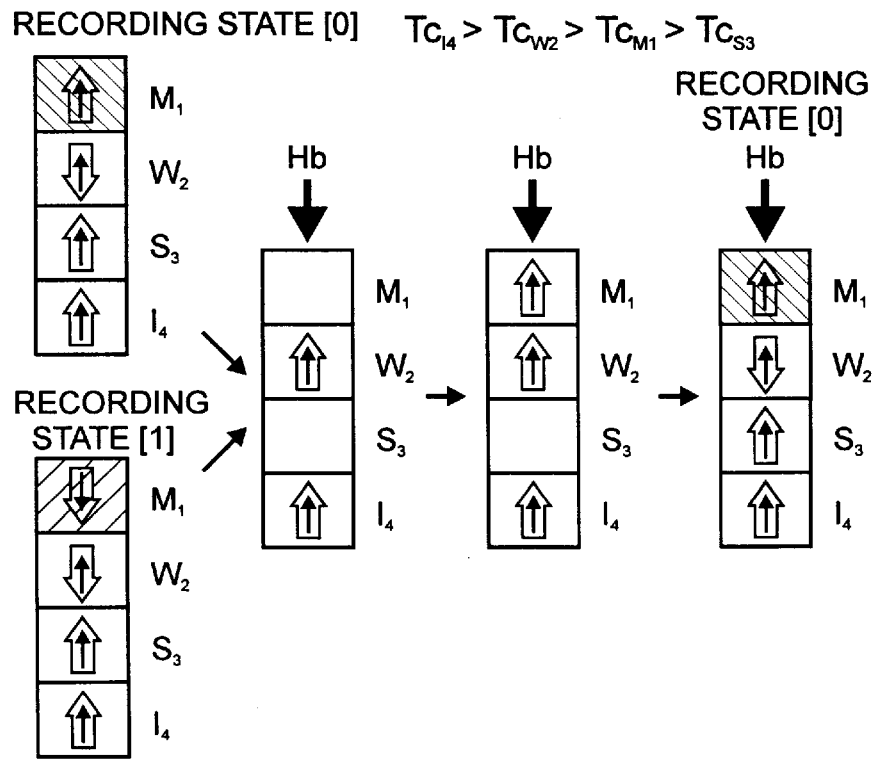
FIG. 6 is a further illustration of overwriting on the magneto-optical recording medium according to the invention.

Embodiment II (FIGS. 2, 5, and 6)

A magneto-optical recording medium of FIG. 2 is similar to the magneto-optical recording medium of FIG. 1 with the exception that a recording layer $W_2$ is provided on its surface side with a switching layer $S_3$ and an initializing layer $I_4$ in the described order. The switching layer $S_3$ and initializing layer $I_4$ are each composed of an amorphous alloy containing a rare earth element and a transition element. Each layer is a magnetic layer having perpendicular magnetic anisotropy at room temperature. In FIG. 2, too, adjoining magnetic layers are mutually coupled by exchange force.

To perform the light intensity modulation overwriting to be explained just below, the following two conditions should be satisfied at the same time:

$$Tc_{I4} > Tc_{W2} > Tc_{M1}$$

$$Tc_{I4} > Tc_{W2} > Tc_{S3}$$

Here $Tc_{M1}$ is the Curie temperature of a memory layer $M_1$, $Tc_{W2}$ is the Curie temperature of the recording layer $W_2$, $Tc_{S3}$ is the Curie temperature of the switching layer $S_3$, and $Tc_{I4}$ is a Curie temperature of the initialization layer $I_4$. More preferably, $$Tc_{I4} > Tc_{W2} > Tc_{M1} > Tc_{S3}$$

The light intensity modulation overwriting on the magneto-optical recording medium having such a multilayer construction as shown in FIG. 2 is explained with reference to FIGS. 5 and 6, where $Tc_{I4} > Tc_{W2} > Tc_{M1} > Tc_{S3}$.

In FIGS. 5, and 6, [0] indicates a recording state where magnetic domains having upward magnetization are recorded in the recording layer $M_1$, and [1] indicates a recording state where magnetic domains having downward magnetization are recorded therein.

A medium capable of overwriting is placed in the recording state [0] or [1]. FIG. 5 is illustrative of the case where, on overwriting, the medium is put in the recording state [1] irrespective of the initial recording state, and FIG. 6 is illustrative of the case where, on overwriting, the medium is put in the recording state [0] irrespective of the initial recording state.

In the illustrated embodiment where the recording layer $W_2$ has a compensation temperature higher than room temperature, the direction of the overall magnetization is opposite to the direction of magnetization of the transition element subordinate lattice in the recording states [0] and [1]. In other magnetic layer, both arrows are in alignment with each other in the illustrated embodiment wherein it has no compensation temperature or a compensation temperature lower than room temperature.

Referring first to FIG. 5, the magnetic multilayer structure is irradiated with a laser beam to heat the area of the magnetic multilayer structure irradiated to a temperature that is higher than $Tc_{W2}$ and below $Tc_{I4}$, thereby allowing the magnetizations of the magnetic layers other than the initializing layer $I_4$ to vanish. As the laser beam moves, the temperature of the magnetic multilayer structure decreases. Upon the temperature falling below $Tc_{W2}$ and being higher than the compensation temperature of the recording layer $W_2$, the recording layer $W_2$ is magnetized downward by a downwardly applied bias magnetic field Hb, and so the magnetization of the transition element subordinate lattice in the recording layer $W_2$ takes a downward direction. It is here to be noted that the bias magnetic field Hb is always applied for overwriting. Upon the temperature decreasing further and falling below $Tc_{M1}$ and being higher than the compensation temperature of the recording layer $W_2$, the magnetization of the transition element subordinate lattice in the memory layer $M_1$ takes a downward direction by the exchange coupling force between the memory layer $M_1$ and the recording layer $W_2$, and so the magnetic multilayer structure is placed in the recording state [1]. As the temperature decreases further and reaches a temperature that is below $Tc_{S3}$ and the compensation temperature of the recording layer $W_2$, magnetization occurs at the switching layer $S_3$, so that the direction of magnetization of the transition element subordinate lattice in the switching layer $S_3$ takes an upward direction by the exchange force between the switching layer $S_3$ and the memory layer $M_1$ and the magnetization of the transition element subordinate lattice in the recording layer $W_2$ is reversed in an upward direction by the exchange force between the recording layer $W_2$ and the switching layer $S_3$. To prevent a reversal of the magnetization of the memory layer $M_1$ at this time, the properties of each magnetic layer are predetermined in such a manner that, in this temperature range, the coercive force of the memory layer $M_1$ prevails over the exchange coupling force between the memory layer $M_1$ and the recording layer $W_2$. Furthermore, the properties of each magnetic layer are predetermined in such a manner that the exchange coupling force at the switching layer $S_3$ prevails over the influence of the bias magnetic field.

Referring to FIG. 6 the magnetic multilayer structure is irradiated with a laser beam whose power is lower than is the case with FIG. 5 to heat the magnetic multilayer structure to a temperature that is higher than $Tc_{M1}$ and below $Tc_{W2}$, thereby allowing the magnetizations of the memory layer $M_1$ and the switching layer $S_3$ to vanish. Then, as the temperature of the magnetic multilayer structure is below $Tc_{M1}$, the magnetization of the transition element subordinate lattice in the memory layer $M_1$ takes an upward direction by the exchange force between the memory layer $M_1$ and the recording layer $W_2$, and so the magnetic multilayer structure is placed in the recording state [0]. As the temperature decreases further and falls below $Tc_{S3}$, magnetization occurs at the switching layer $S_3$; upward magnetization of the transition element subordinate lattice occurs at the switching layer $S_3$ by the exchange coupling force between the switching layer $S_3$ and the initializing layer $I_4$ and the exchange coupling force between the switching layer $S_3$ and the recording layer $W_2$. In FIG. 6, too, the bias magnetic field Hb is always applied, as in the case of FIG. 5. However, this bias magnetic field Hb has no influence on the overwriting process of FIG. 6.

Whether in the case of high power recording of FIG. 5 or in the case of low power recording of FIG. 6, the magnetizations of the transition element subordinate lattices in the recording layer $W_2$, switching layer $S_3$ and initializing layer $I_4$ take an upward direction, and go back to their state before overwriting. In other words, the directions of the magnetizations of the recording layer $W_2$, switching layer $S_3$ and initializing layer $I_4$ other than the memory layer $M_1$ that determines the recording state are independent of hysteresis (overwriting). By irradiating the magnetic multilayer structure with a laser beam of high power or lower, therefore, it is possible to perform overwriting repeatedly. In other words, the light intensity modulation overwriting becomes feasible.

As can be see from FIGS. 5 and 6, each magnetic layer has the following role. The memory layer $M_1$ is a magnetic layer for storing the information to be read using the Kerr effect. The recording layer $W_2$ is a magnetic layer that plays a role in the magnetization of the memory layer $M_1$ by exchange coupling force, and determines the direction of magnetization of the memory layer $M_1$. The switching layer $S_3$ is a magnetic layer provided for cutting off a magnetic coupling between the recording layer $W_2$ and the initializing layer $I_4$ upon high power recording. As the switching layer $S_3$ is non-magnetized upon high power recording, the recording layer $W_2$ is magnetized in the direction of the bias magnetic field while it is not affected by the initializing layer $I_4$. The initializing layer $I_4$ is a magnetic layer that has always magnetization in one direction for the initialization of the recording layer $W_2$.

For simplicity of illustration, the magnetic multilayer structure is assumed to be heated to a temperature higher than $Tc_{W2}$ and below $Tc_{I4}$ in the case of FIG. 5. However, if the recording layer $W_2$ can practically be in alignment with the direction of the bias magnetic field, the target temperature can then be below $Tc_{W2}$. Likewise, the magnetic multilayer structure is assumed to be heated to a temperature higher than $Tc_{M1}$ and below $Tc_{W2}$ in the case of FIG. 6. However, if the magnetization of the recording layer $W_2$ can be transferred to the memory layer $M_1$, the target temperature can then be below $Tc_{M1}$.

In FIGS. 5 and 6, the condition $Tc_{I4} > Tc_{W2} > Tc_{M1} > Tc_{S3}$ is assumed to hold. However, there is neither upper nor lower limit on $Tc_{M1}$ and $Tc_{S3}$, as already noted. In other words, the condition $Tc_{S3} > Tc_{M1}$ may also hold unlike FIGS. 5 and 6. If, in this case, the exchange force between the switching layer $S_3$ and the recording layer $W_2$ remains small by the time the magnetization of the recording layer $W_2$ is transferred to the memory layer $M_1$, no problem arises because no reversal of the magnetization of the recording layer $W_2$ occurs even when magnetization occurs at the switching layer $S_3$. If the switching layer $S_3$ has a composition (compensation temperature composition) whose compensation temperature lies in the vicinity of room temperature, the exchange energy of the switching layer $S_3$ then increases at a further decreased temperature. Thus, the magnetization of the recording layer $W_2$ is reversed (initialized) by the exchange force between the this layer and the switching layer $S_3$; overwriting independent of hysteresis becomes feasible as in FIGS. 5 and 6.

Magnetic Multilayer Structure

Readout Layer $R_{01}$ Memory Layer $M_1$, and Exchange Force Control Layer $C_{12}$ These magnetic layers have the same constructions as in embodiment I.

When the exchange force control layer $C_{12}$ is made up of the layer (1) as mentioned above, the easy axis of magnetization thereof takes a vertical direction. In FIGS. 5 and 6, therefore, transfer of magnetization from the recording layer $W_2$ to the memory layer $M_1$ by exchange force takes place easily. Then, the magnetization of the recording layer $W_2$ is reversed (initialized) by the initializing layer $I_4$ via the switching layer $S_3$. Since, at this time, the easy axis of magnetization of the exchange force control layer $C_{12}$ is in its own plane direction, the exchange force between the memory layer $M_1$ and the recording layer $W_2$ can be cut off, so that a change in the state of magnetization of the memory layer $M_1$ can be effectively prevented.

Recording Layer $W_2$

The recording layer $W_2$ in embodiment II contains Dy, Fe, and Co as main components, and the rare earth element content of the recording layer $W_2$ is preferably 29 to 35 at %, and more preferably 30 to 33 at %. Too low a rare earth element content renders the initialization of the recording layer $W_2$ for high power recording difficult, resulting in some considerable C/N drop upon overwriting. Too high a rare earth element content, on the other hand, causes the compensation temperature of the recording layer $W_2$ to disappear, giving rise to some considerable C/N drop, and resulting in a much more reduced C/N upon overwriting.

The recording layer $W_2$ has an atomic ratio, Fe/(Fe+Co), of 0.40 to 0.58, and preferably 0.45 to 0.55. Too low an atomic ratio gives rise to a C/N drop whereas too high an atomic ratio results in some considerable C/N drop upon over-writing.

For the recording layer $W_2$, it is preferable to have a compensation temperature in a range of temperature that is higher than room temperature and lower than the temperature at which magnetization is transferred to the memory layer $M_1$. That is, the compensation temperature of the recording layer $W_2$ is preferably 100 to 160° C.

The recording layer $W_2$ is otherwise the same as that in embodiment I.

Switching Layer $S_3$

The switching layer $S_3$ contains Tb, and Fe as main components. The Tb content of the switching layer $S_3$ is in the range of preferably 23 to 29 at %, and more preferably 24 to 27 at %. Too little or much Tb causes exchange coupling to become weak due to a Curie temperature drop and a saturation magnetization increase.

The switching layer $S_3$ has a thickness of preferably 5 to 15 nm, and more preferably 8 to 12 nm. When the switching layer $S_3$ is too thin, the cutoff of exchange force between the recording layer $W_2$ and the initializing layer $I_4$ becomes insufficient. When the switching layer $S_3$ is too thick, the exchange forces between this layer and the recording layer $W_2$ and this layer and the initializing layer $I_4$ become too small for the initialization of the recording layer $W_2$.

Initializing Layer $I_4$

The initializing layer $I_4$ contains Tb, and Co as main components. The Tb content of the initializing layer $I_4$ is in the range of preferably 21 to 28 at %, and more preferably 23 to 27 at %.

The initializing layer $I_4$ has a thickness of preferably 15 to 50 nm, and more preferably 18 to 45 nm. When the initializing layer $I_4$ is too thin, the exchange force between this layer and the recording layer $W_2$ becomes too large for keeping the magnetization of the initializing layer $I_4$ in one direction, because spin reversal is likely to occur. No particular problem arises when the initializing layer $I_4$ is thick. However, a thickness exceeding 50 nm is not necessary because of a film formation cost increase.

In both embodiments I and II, each magnetic layer may additionally contain a rare earth element other than that referred to as the main component. By the rare earth element used herein are intended yttrium or Y, scandium or Sc, and lanthanide elements. Each magnetic layer may also contain a transition element other than that referred to as the main component.

Substrate

To write or read information on or out of a magneto-optical recording medium, the back side (the side of the memory layer $M_1$) of the substrate is irradiated with laser light. To this end, it is preferable that the substrate is transparent to laser light (of about 400 to 900 nm wavelength). For instance, transparent resins such as polycarbonate, acrylic resin, amorphous polyolefin, and styrene resin or glasses may be used for the substrate.

First, and Second Dielectric Layers

The first, and second dielectric layers are provided for the purposes of improving C/N, and preventing corrosion of the magnetic layers. When the heat radiating layer is provided, the second dielectric layer behaves not only as an accumulator for heat generated from the recording layer during recording but also as a transmitter for transmitting the heat to the heat radiating layer.

Preferably, the first dielectric layer has usually a thickness of 30 to 100 nm, and the second dielectric layer has usually a thickness of 5 to 100 nm.

Each dielectric layer may be constructed of an oxide or nitride or their mixture, for instance, silicon oxide, silicon nitride, aluminum nitride, and SiAlON.

Heat Radiating Layer

The heat radiating layer, provided as occasion arises, acts to radiate heat from the magnetic multilayer structure during recording. The heat radiating layer has usually a thickness of 20 to 80 nm although the invention is not limited thereto.

The heat radiating layer is constructed of a metal (inclusive of an alloy). Preferably, the heat radiating layer is composed of Al, Au, Ag, and Cu or an alloy containing at least one thereof, to which suitable amounts of additive elements such as Ni, Ti, Cr, Zn, and Co may be added.

Protective Layer

Preferably, the heat radiating layer is provided on its surface with a protective layer formed of a resin such as ultraviolet radiation curing resin. The protective layer has preferably a thickness of 1 to 30 $\mu$m. Such a protective layer may also be provided on the back side of the substrate.

EXAMPLE

Example 1 (Embodiment II)

For a substrate, a disk form of polycarbonate of 120 mm in outer diameter and 1.2 mm in thickness was used (with a track pitch of 1.1 $\mu$m). Using a second dielectric layer and a heat radiating layer, each with a thickness shown in Table 2, a magneto-optical recording disk sample No. 1 having such a multilayer construction as shown in FIG. 2 was prepared in the following procedure.

First Dielectric Layer

Using an Si target, a silicon nitride film was formed by a sputtering process in an Ar plus $N_2$ atmosphere to obtain a first dielectric layer of 60 nm in thickness.

Each Magnetic Layer in Magnetic Multilayer Structure

Each magnetic layer was prepared by a sputtering process in an Ar atmosphere.

Second Dielectric Layer

A second dielectric layer of 10 nm in thickness was prepared as in the first dielectric layer.

Heat Radiating Layer

Using an Al-Ni alloy target, a heat radiating layer was prepared by a sputtering process in an Ar atmosphere.

Protective Layer

An ultraviolet radiation curing resin was applied by a spin coating process on the heat radiating layer, and then irradiated with ultraviolet radiation for curing, thereby obtaining a protective layer of about 5 μm in thickness.

The composition, thickness, and Curie temperature (Tc) of each magnetic layer are indicated in Table 1. Compensation temperatures (Tcomp), which some magnetic layers have, are also indicated. It is here to be noted that the compositions of the magnetic layers were determined with an Auger analyzer after their properties had been estimated as will be described layer. The thickness of each magnetic layer was found from the sputtering rate and time. The sputtering rate was determined from the actually found thickness of a thick film formed by long-term sputtering under the same conditions as actually applied, and the sputtering time.

were changed as shown in Table 2. In this regard, it is to be noted that the Fe to Co ratio was held at the same value as in sample No. 1 irrespective of the rare earth element content of each magnetic layer. The rare earth element contents shown in Table 2 are the Gd content for the readout layer $R_{01}$, the Tb content for the memory layer $M_1$, and the Gd content for the exchange force control layer $C_{12}$.

Estimation of Properties

The properties of each sample were estimated using an optical disk estimating device under the following conditions.

Laser Wavelength: 680 nm

Numerical Aperture NA: 0.55

Recording Power: 13 mW for high power recording 4 mW for low power recording

Read Power: 1.5 mW

Bias Magnetic Field: 300 Oe

Relative Linear Velocity: 7.4 m/s

Recording Pattern: pulse division mode 20 ns (on)-152 ns (off)

C/N values determined after 10,000 overwriting cycles are shown in Table 2.

TABLE 2

| Sample No. | Rare Earth Element (at %) | | | Thickness (nm) | | | $t_{R01}/$ $(t_{R01} + t_{M1})$ | C/N (dB) after overwriting cycles |
|---|---|---|---|---|---|---|---|---|
| | $R_{01}$ | $M_1$ | $C_{12}$ | $R_{01}$ | $M_1$ | $C_{12}$ | | |
| 1 | 25 | 23 | 27 | 10 | 15 | 10 | 0.4 | 49 |
| 2 | 23 | 23 | 27 | 10 | 15 | 10 | 0.4 | 48 |
| 3 | 27 | 23 | 27 | 10 | 15 | 10 | 0.4 | 47 |
| 4 | 25 | 20 | 27 | 10 | 15 | 10 | 0.4 | 47 |
| 5 | 25 | 24 | 27 | 10 | 15 | 10 | 0.4 | 48 |
| 6 | 25 | 23 | 24 | 10 | 15 | 10 | 0.4 | 47 |
| 7 | 25 | 23 | 30 | 10 | 15 | 10 | 0.4 | 47 |
| 8 | 25 | 23 | 27 | 8 | 17 | 10 | 0.32 | 46 |
| 9 | 25 | 23 | 27 | 13 | 12 | 10 | 0.52 | 46 |
| 10 | 25 | 23 | 27 | 16 | 20 | 10 | 0.44 | 46 |
| 11 | 25 | 23 | 28 | 10 | 20 | 25 | 0.4 | 47 |
| 12 (comp.) | 22* | 23 | 27 | 10 | 15 | 10 | 0.4 | 43 |
| 13 (comp.) | 28* | 23 | 27 | 10 | 15 | 10 | 0.4 | 42 |
| 14 (comp.) | 25 | 19* | 27 | 10 | 15 | 10 | 0.4 | 40 |
| 15 (comp.) | 25 | 27* | 27 | 10 | 15 | 10 | 0.4 | 42 |
| 16 (comp.) | 25 | 23 | 22* | 10 | 15 | 10 | 0.4 | 41 |
| 17 (comp.) | 25 | 23 | 33* | 10 | 15 | 10 | 0.4 | 41 |
| 18 (comp.) | 25 | 23 | 27 | 6 | 19 | 10 | 0.24* | 44 |
| 19 (comp.) | 25 | 23 | 27 | 17 | 8 | 10 | 0.68* | 41 |
| 20 (comp.) | 25 | 23 | 27 | 20* | 25* | 10 | 0.44 | 42 |
| 21 (comp.) | 25 | 23 | 27 | 10 | 15 | 40* | 0.4 | 40 |

*deviations from the scope of the invention

TABLE 1

| Magnetic Layer | Composition at % | Thickness nm | Tc °C. | Tcomp °C. |
|---|---|---|---|---|
| Readout Layer $R_{01}$ | $Gd_{25}Fe_{53}Co_{22}$ | 10 | >300 | — |
| Memory Layer $M_1$ | $Tb_{23}Fe_{69}Co_8$ | 15 | 180 | — |
| Exchange Force Control Layer $C_{12}$ | $Gd_{27}Fe_{52}Co_{21}$ | 10 | >300 | 150 |
| Recording Layer $W_2$ | $Dy_{31}Fe_{35}Co_{34}$ | 30 | 280 | 120 |
| Switching Layer $S_3$ | $Tb_{25}Fe_{75}$ | 10 | 150 | 20 |
| Initializing Layer $I_4$ | $Tb_{26}Co_{74}$ | 40 | >300 | 180 |

Then, a number of samples, shown in Table 2, were prepared as in sample No. 1 with the exception that the rare earth element contents, and thicknesses of the readout layer $R_{01}$, memory layer $M_1$, and exchange force control layer $C_{12}$ Table 2 clarifies the advantages of the invention. In the inventive samples, high C/N values are obtained even after 10,000 overwriting cycles due to high recorded information storage stability. This is in sharp contrast to the comparative samples wherein much lower C/N values are obtained after 10,000 overwriting cycles because the rare earth element content, and thickness of the readout layer $R_{01}$, memory layer $M_1$, and exchange force control layer $C_{12}$ deviate from the scope of the invention.

Example 2 (Embodiment I)

A magneto-optical recording disk sample having such a multilayer construction as shown in FIG. 1 was prepared as in sample No. 1 of example 1 with the exception that the composition (in atomic ratio) of the recording layer $W_2$ was changed to $Dy_{32}Fe_{34}Co_{34}$, with no provision of the switching layer $S_3$ and initializing layer $I4$. The C/N of this sample was measured as in example 1. For this measurement, however, a magnetic field of 3 kOe was applied as the initializing magnetic field. The initial C/N value was 48 dB, and the C/N value after 10,000 overwriting cycles was again 48 dB. Thus, there was no degradation.

The results of each example clarify the advantages of the invention.

Japanese Patent Application 137859/1997 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

What we claim is:

1. A magneto-optical recording medium capable of direct overwriting in a light intensity modulation mode, which comprises a substrate and a magnetic multilayer structure located on a surface side thereof, wherein:

said magnetic multilayer structure comprises, in order from a substrate side thereof, a readout layer $R_{01}$, a memory layer $M_1$, an exchange force control layer $C_{12}$ and a recording layer $W_2$, each of said magnetic layers containing a rare earth element and a transition element, said readout layer $R_{01}$, said memory layer $M_1$, and said recording layer $W_2$ having perpendicular magnetic anisotropy at room temperature, and adjacent magnetic layers being mutually coupled with exchange force, said magnetic multilayer structure satisfying the following conditions:

$$Tc_{W2} > Tc_{M1}$$

$$t_{R01}/(t_{R01}+t_{M1}) = 0.3 \text{ to } 0.6$$

$$t_{R01}+t_{M1} = 20 \text{ to } 40 \text{ nm}$$

where $Tc_{M1}$ is a curie temperature of said memory layer $M_1$, $Tc_{W2}$ is a Curie temperature of said recording layer $W_2$, $t_{R01}$ is a thickness of said readout layer $R_{01}$, and $t_{M1}$ is a thickness of said memory layer $M_1$, said readout layer $R_{01}$ containing gadolinium, iron, and cobalt as main components with the proviso that gadolinium is contained in an amount of 23 to 27 at %, said memory layer $M_1$ containing terbium, iron, and cobalt as main components with the proviso that terbium is contained in an amount of 21 to 25 at %, and said exchange force control layer $C_{12}$ containing gadolinium, iron, and cobalt as main components with the proviso that gadolinium is contained in an amount of 23 to 32 at %, and having a thickness of 30 nm or below.

2. The magneto-optical recording medium of claim 1, wherein said recording layer $W_2$ contains dysprosium, iron, and cobalt as main components.

3. The magneto-optical recording medium of claim 1, wherein said magnetic multilayer structure has a thickness of up to 80 nm.

4. The magneto-optical recording medium of claim 1, wherein:

said magnetic multilayer structure further comprises, in order from a surface side of said recording layer $W_2$, a switching layer $S_3$ and an initializing layer $I_4$, each being a magnetic layer containing a rare earth element and a transition element and having perpendicular magnetic anisotropy at room temperature, adjacent layers in said magnetic multilayer structure are mutually coupled with exchange force, and said magnetic multilayer structure satisfy simultaneously the following conditions:

$$Tc_{I4} > Tc_{W2} > Tc_{M1}$$

$$Tc_{I4} > Tc_{W2} > Tc_{S3}$$

where $Tc_{M1}$ is the Curie temperature of said memory layer $M_1$, $Tc_{W2}$ is the Curie temperature of said recording layer $W_2$, $Tc_{S3}$ is a Curie temperature of said switching layer $S_3$, and $Tc_{I4}$ is a Curie temperature of said initializing layer $I_4$.

5. The magneto-optical recording medium of claim 4, wherein said switching layer $S_3$ contains terbium, and iron as main components, and said initializing layer $I_4$ contains terbium, and cobalt as main components.

* * * * *